Sept. 6, 1966 H. P. FURTH 3,271,716
HIGH-CURRENT PULSE TRANSFORMER
Filed May 28, 1962 9 Sheets-Sheet 1
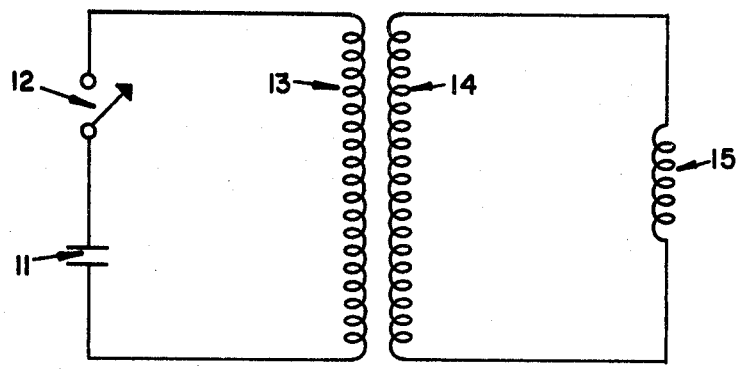
(1a)
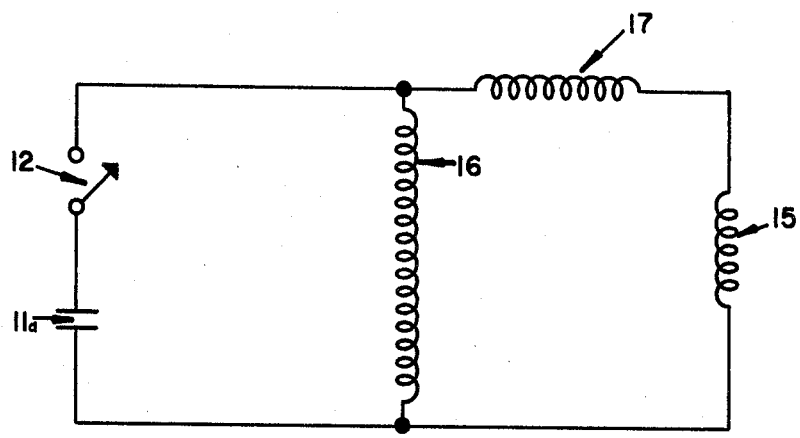
(1b)
INVENTOR:
HAROLD P. FURTH
FIGURE—1

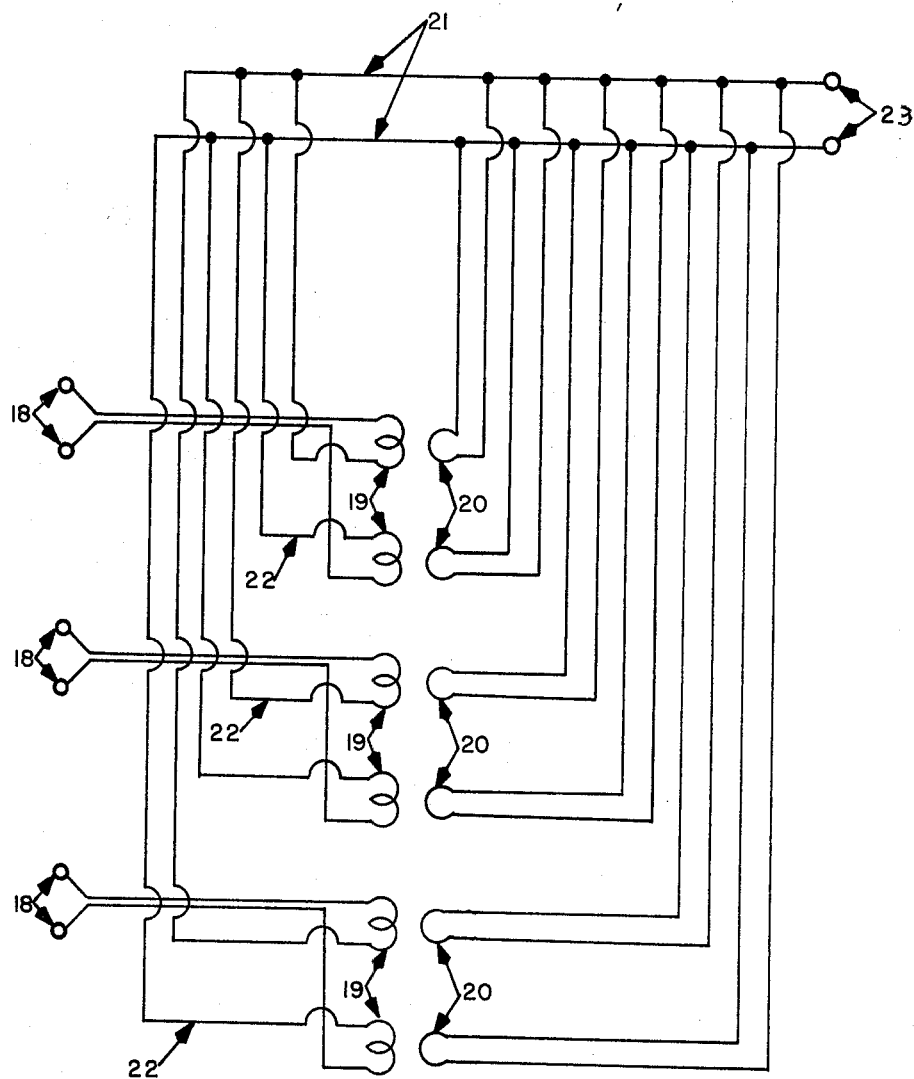
FIGURE—2

Sept. 6, 1966  H. P. FURTH  3,271,716
HIGH-CURRENT PULSE TRANSFORMER
Filed May 28, 1962  9 Sheets-Sheet 3
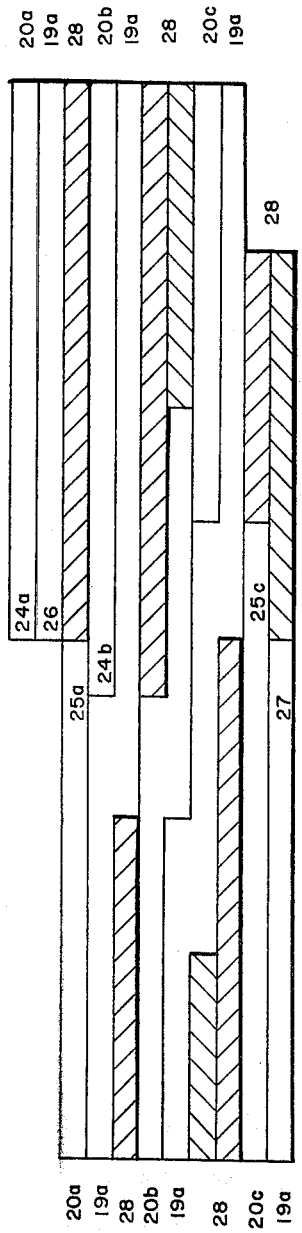
FIGURE—3a
INVENTOR
HAROLD P. FURTH

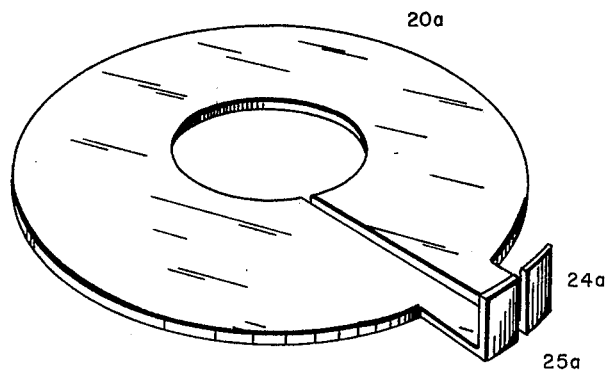
FIGURE—3b
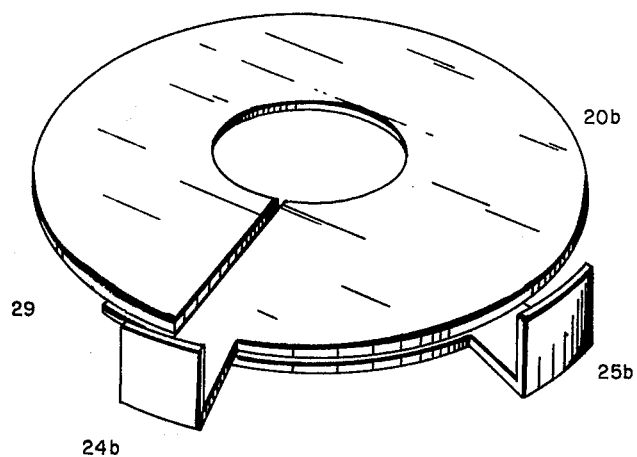
FIGURE—3c

Sept. 6, 1966 H. P. FURTH 3,271,716
HIGH-CURRENT PULSE TRANSFORMER
Filed May 28, 1962 9 Sheets-Sheet 5
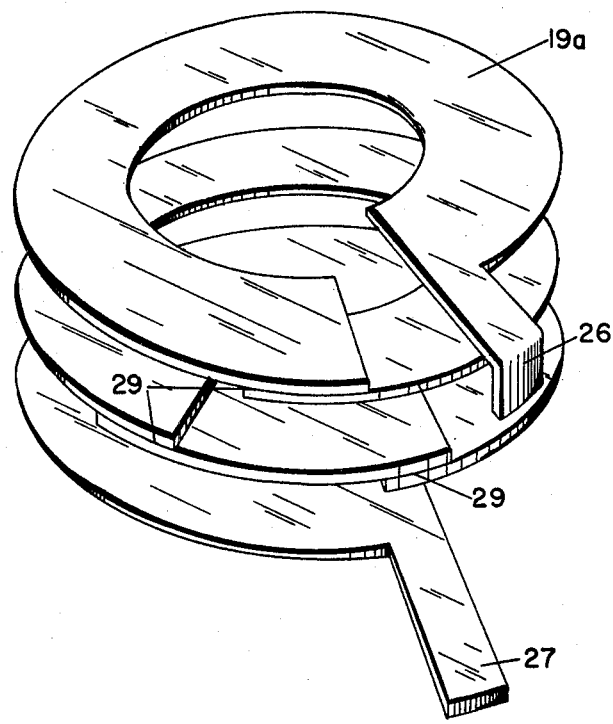
FIGURE—3d
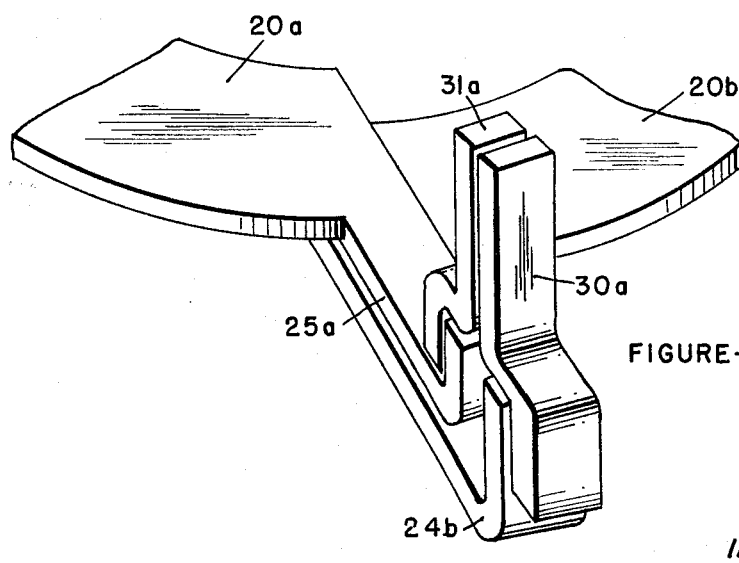
FIGURE—3e
INVENTOR
HAROLD P. FURTH Sept. 6, 1966 H. P. FURTH 3,271,716
HIGH-CURRENT PULSE TRANSFORMER
Filed May 28, 1962 9 Sheets-Sheet 6
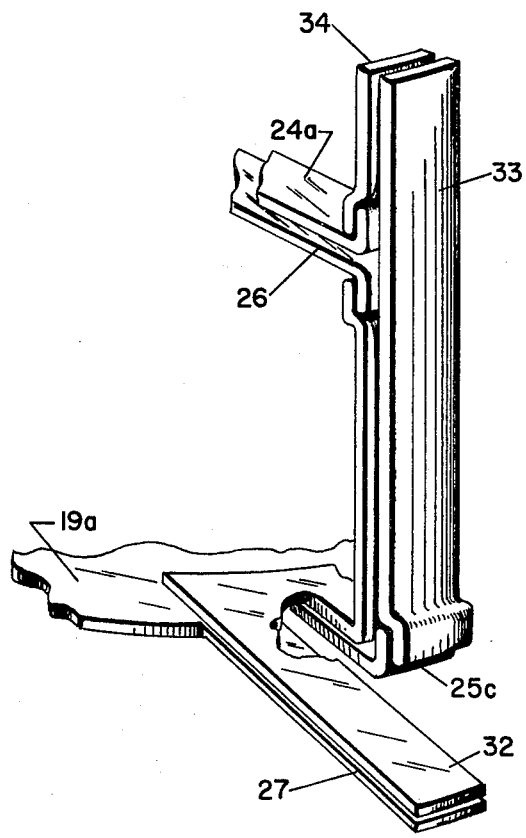
FIGURE-3f
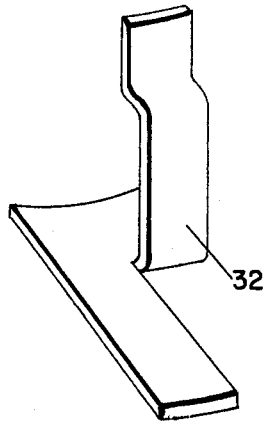
FIGURE—3g
INVENTOR:
HAROLD P. FURTH Sept. 6, 1966          H. P. FURTH          3,271,716

HIGH-CURRENT PULSE TRANSFORMER

Filed May 28, 1962          9 Sheets-Sheet 7

PART CIRCLED ON FIGURE-5

INVENTOR
HAROLD P. FURTH

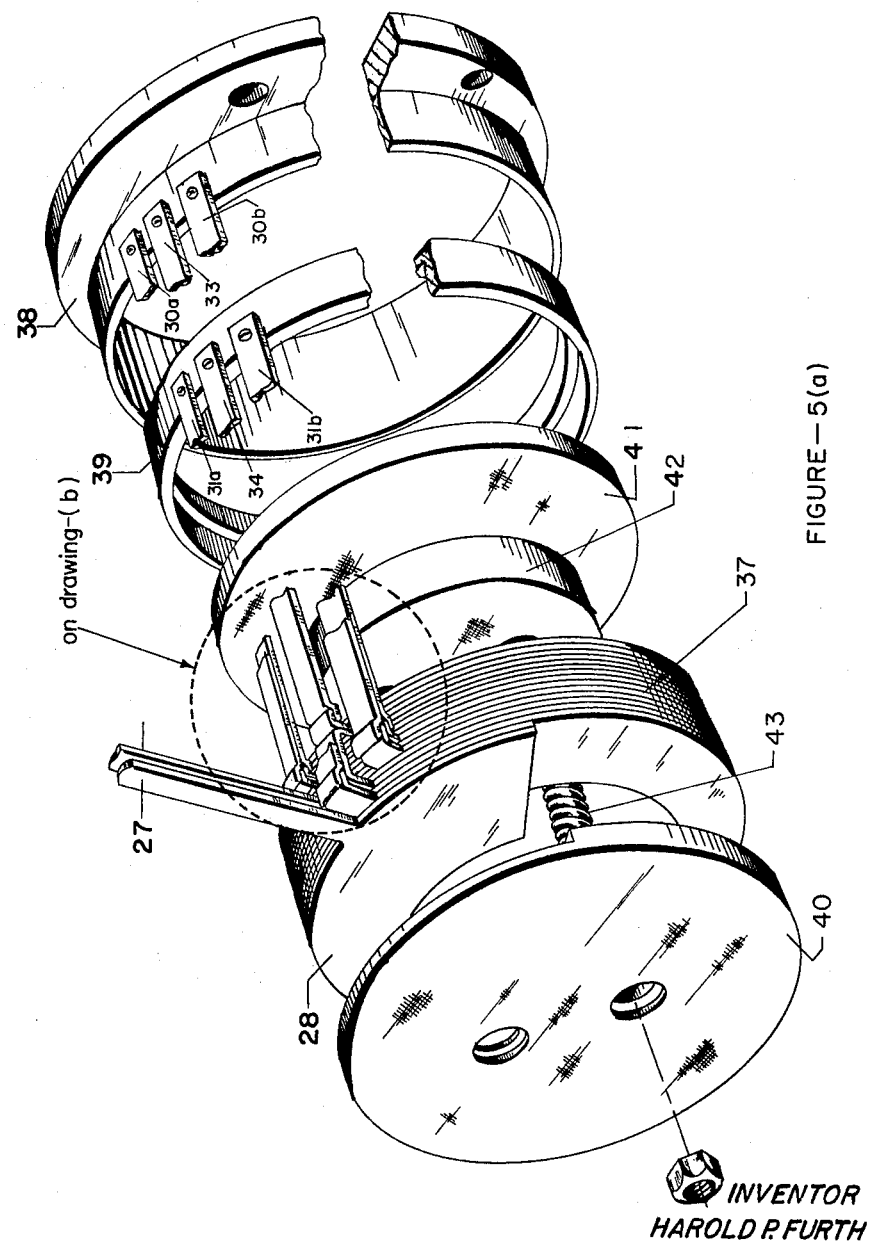
FIGURE—5(a)

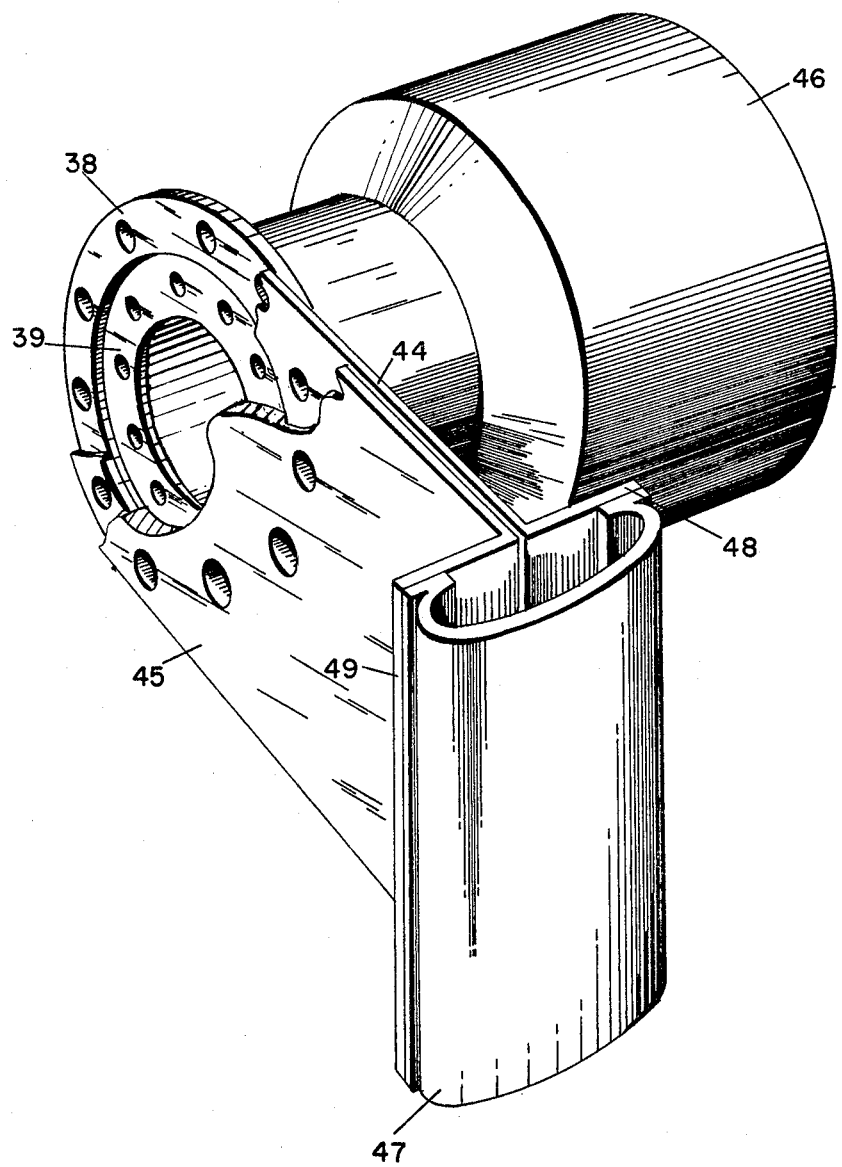
FIGURE—6

United States Patent Office 3,271,716
Patented Sept. 6, 1966

3,271,716
HIGH-CURRENT PULSE TRANSFORMER
Harold P. Furth, Berkeley, Calif., assignor to Advanced Kinetics, Inc., Costa Mesa, Calif., a corporation of California
Filed May 28, 1962, Ser. No. 198,273
5 Claims. (Cl. 336—181)

The present invention relates generally to the current and voltage transformation of an electrical pulse, and more particularly to a device for the transformation of a high-energy, high-voltage pulse into a high-energy, high-current pulse, in an optimally efficient manner.

A high-energy electrical pulse can be obtained by discharging a capacitor bank through a switch. For many purposes, such as magnetic metal-forming, generation of pressure waves in a fluid or electrical heating of an ionized gas, much higher currents and voltages are desired than can be obtained conveniently by the capacitor-discharge method. An electrical pulse transformer may be used to increase the current and decrease the voltage of the electrical pulse from the capacitor bank.

An object of the present invention is to provide a device for transforming an electrical pulse with high efficiency so as to increase its current to high values. Another object is to provide a device of moderate size capable of transforming a high-energy electrical pulse, by virtue of great mechanical strength and limited use or no use of saturable ferromagnetic materials.

Additional objects and advantages of the present invention will become apparent from the following description and appended claims.

In the drawings:

FIGURE 1a is a circuit diagram of a capacitor bank, transformer, and load. FIGURE 1b is an equivalent circuit diagram for FIGURE 1a.

FIGURE 2 is a circuit diagram for a current step-up transformer with multiple primary windings and an optional auto-transformer feature.

FIGURE 3a is a sectional view of a transformer winding.

FIGURES 3b and c are perspective views of one-turn secondary windings. FIGURE 3d is a perspective view of a multi-turn primary winding. FIGURES 3e and f are perspective views of lead connections to the primary and secondary windings.

FIGURE 3g is a perspective view of low inductance lead 32.

Figure 4:
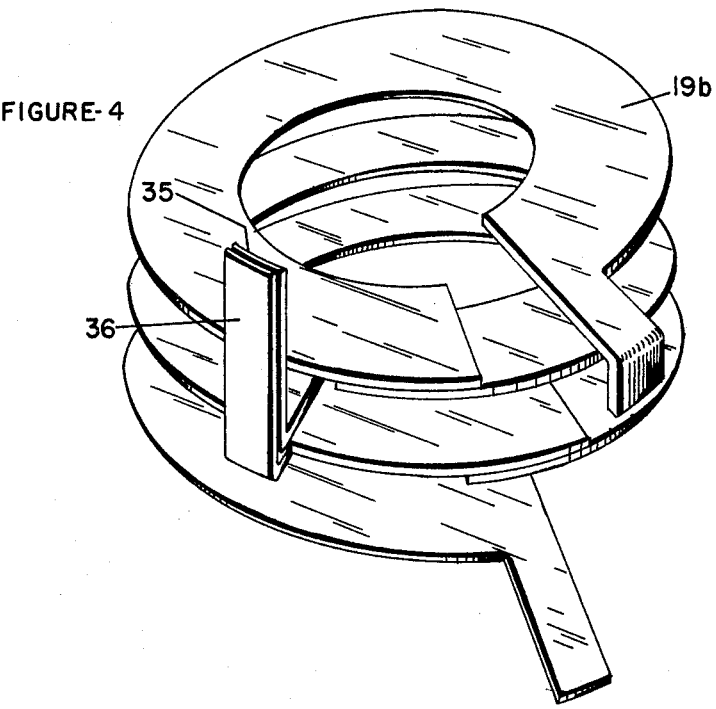

FIGURE 4 is a perspective view of a multi-turn primary winding with interrupter leads suited to an auto-transformer connection.

FIGURE 5a is a schematic, exploded perspective view of a transformer assembly, showing one complete primary winding with associated secondary windings.

Figure 5B:
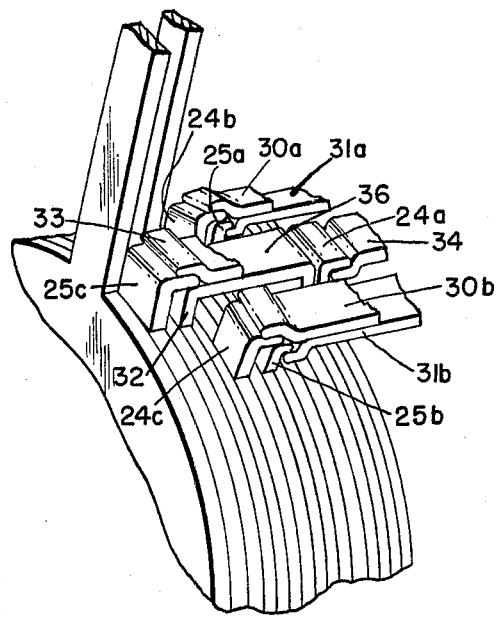

FIGURE 5b is a perspective view of the encircled portion of FIG. 5a.

FIGURE 6 is a schematic perspective view of a pulse transformer with attached device for generating pressure waves in a fluid.

The basic pulse-transformer circuit, as shown in FIGURE 1a, consists of a capacitor source that is discharged by a switch into the primary winding of a transformer. The secondary winding is connected to the load. For most high-energy, high-current loads of practical interest, the circuit response of the load may be approximated as that of an inductance, and this approximation will be adopted in the following discussion. The transformer windings will also be approximated as pure inductances.

The current multiplication due to the transformer element is given approximately by the ratio $R_n$ of the number of turns in the primary winding to the number of turns in the secondary winding. To analyze the efficiency of energy transfer to the load, the equivalent circuit of FIGURE 1b is useful. The equivalent capacity that appears in this circuit is to be taken as $R_n^2$ times the capacity in the circuit of FIGURE 1a. When no load is attached to the transformer secondary, the capacitor will discharge through the primary winding at a rate that is limited by the magnitude of the inductance of the primary winding. The appropriate equivalent inductance $L_s$, referred to as the shunt inductance of the transformer, is shown shunting the capacitor in FIGURE 1b. The magnitude of $L_s$ is $1/R_n^2$ times the inductance of the primary winding of the transformer. When a short-circuit is attached to the transformer secondary, the rate of discharge of the capacitor is increased, as though an additional inductance $L_e$ had been connected in parallel with the inductance $L_s$. When a load inductance of finite magnitude is attached to the transformer secondary, the capacitor discharge takes place as though into a shunt inductance $L_s$ which is connected in parallel with two series inductances $L_e$ and $L_o$, where $L_o$ is the inductance of the load. This circuit behavior is represented by the equivalent circuit of FIGURE 1b. The efficiency of energy transfer to the load is calculated from the equivalent circuit to be $$\epsilon = \left[1 + \frac{L_e}{L_s} + \frac{(L_o + L_e)^2}{L_o M_s}\right]^{-1} \tag{1}$$

For a given transformer, the optimum load inductance for maximum energy transfer is given by $$L_o = (L_s L_e + L_e^2)^{1/2} \tag{2}$$

Efficiencies approaching unity are obtainable only when $L_e/L_o$, $L_o/L_s \ll 1$. In that case, Eq. 1 may be approximated as $$\epsilon = 1 - \frac{L_e}{L_o} - \frac{L_o}{L_s} \tag{1a}$$

and Eq. 2 may be approximated as $$L_o = (L_s L_e)^{1/2} \tag{2a}$$

For the optimum choice of $L_o$, the efficiency becomes then $$\epsilon = -2(L_e/L_s)^{1/2} \tag{3}$$

From Eq. 3 one sees that in order to obtain a high efficiency, the ratio $L_e/L_s$ must be small. For example, to obtain an efficiency of .8, the ratio $L_e/L_s$ must be .01.

Typical parameters for high-energy, high-current pulses into loads of practical interest are the following. Energy transfers are in the range 1000 to 1,000,000 joules, currents are in the range 100,000 to 10,000,000 amperes, and pulse times are in the range 1–100 microseconds. Capacitor voltages are commonly in the range 5000–20,000 volts. A typical example of a pulse-transformer operation would be to transfer 10,000 joules in 10 microseconds with input voltage of 10,000 volts and an output current of 1,000,000 amperes. For this example, the load inductance is .02 microhenry, and a 3:1 current step-up transformer is needed. The practical advantage of the transformer is to permit the switching to be done at the 330,000 amperes level, rather than at the 1,000,000 ampere level, which is more easily feasible; and to permit the capacitative energy to be stored at 10,000 volts instead of 3,300 volts, which is more economical. For efficient transformer operation, the leakage inductance $L_e$ should be of order .002 microhenry, and the shunt inductance $L_s$ should be of order .2 microhenry.

In view of the smallness of the leakage inductance $L_e$ that is typically desired, the typical secondary winding of a transformer designed in accordance with the present invention consists of a number of one-turn windings connected in parallel to common terminals. The shunt inductance $L_s$ is then given approximately by $$L_s = \frac{r^2 \bar{\mu}}{25(r+z)} \quad (4)$$

where $r$ is the mean radius of the primary winding in cm., $z$ is the height of the primary winding in cm., $\bar{\mu}$ is the effective mean permeability, relative to vacuum, of ferromagnetic material that may be used in the transformer, and $L_s$ is $1/R_n^2$ times the inductance of the primary winding in microhenries. In a transformer designed in accordance with the present invention the primary and secondary windings will be seen to be closely interleaved, so that the overall dimensions of the primary and secondary windings are approximately the same, and $L_s$ is therefore approximately equal to the inductance of the secondary winding. If no ferromagnetic materials are used to increase the shunt inductance $L_s$ of the transformer, then $\bar{\mu}=1$, and the achievement of a typical shunt inductance value of .2 microhenry requires a transformer dimensions $r$ and $z$ that are of order 10 cm. The shunt inductance may be increased, or the physical size diminished by surrounding the interleaved primary and secondary windings partly or wholly with ferromagnetic material. To minimize eddy-current losses in the ferromagnetic material, it must be provided in laminated or powdered form. For high-energy, high-current pulses, the magnetic field appearing within the transformer during the pulse may easily reach values in excess of 10,000 gauss, so that the ferromagnetic material becomes saturated and its usefulness in increasing the shunt inductance disappears. In the typical example given, when the transformer operates into the illustrative load of .02 microhenry, a flux of 2,000,000 gauss cm.$^2$ appears within the transformer. For a mean radius $r=10$ cm., the magnetic field within the transformer is then of order 20,000 gauss, and the value of ferromagnetic materials is therefore negligible. Accordingly, in many cases the size of the transformer cannot be reduced effectively by the use of ferromagnetic materials, and a simple air-core transformer is to be used. A magnetic field of 20,000 gauss exerts a mechanical pressure of 230 pounds per square inch against the transformer winding. To avoid mechanical displacement of windings and damage to insulation due to vibration of windings, the construction of the windings must be highly rigid. A transformer designed in accordance with the present invention consists of primary and secondary windings that are interleaved and rigidly pressed together to form a massive coil of high mechanical strength.

The leakage inductance of a transformer designed in accordance with the present invention may be calculated as follows. The inductance of a plane-parallel transmission line, consisting of two closely spaced metal strips of width $w$, length $s$, and separation $h$ is given by $$L_t = \frac{4\pi hs}{w} 10^{-3} \quad (5)$$

where the dimensions are in cm. units and $L_t$ is in microhenries. To minimize the inductance $L_t$, the separation distance $h$ must be minimized. A lower limit to $h$ is set, however, by the need for high-voltage insulation. Furthermore, from the electrical point of view the effective separation of the two conductors of the transmission line is their physical separation $h_0$ plus twice the skin depth of the current pulse. For a pulse of typical rise time 10 microseconds and for a copper transmission line, the skin depth is of order .05 cm. Therefore the quantity $h$ is typically at least of order .1 cm. The leakage inductance of a transformer designed in accordance with the present invention is calculable as the joint inductance of a number N of equivalent transmission lines connected in parallel, where N is the number of single-turn secondary windings of the transformer, where the dimensions $w$ and $s$ of the equivalent transmission lines correspond to the approximate width and length of a one-turn secondary winding, and where the dimension $h$ corresponds to the effective separation between a secondary winding and the nearest primary winding. If the mean radius of the windings and the width of the windings are of comparable magnitude, then the inductance of the equivalent transmission line for each one-turn secondary winding is of order .01 microhenry. In the typical example given, where a leakage inductance of order .002 microhenry is desired, there must therefore be at least 5 one-turn secondary windings in parallel. Making allowance for increments in leakage inductance due for example to the finite length of connecting transmission lines between the individual secondary windings and the secondary output terminals of the transformer, a practical transformer designed for the typical example given would use about 12 one-turn secondary windings in parallel. To achieve a current step-up ratio $R_n=3$, there would be four three-turn primary windings connected in parallel. Each turn of each primary winding is placed in close proximity to one of the one-turn secondary windings, with electrical insulation of minimal thickness between them, so as to minimize the leakage inductance. The use of a number of primary windings in parallel has the incidental advantage that the current step-up ratio $R_n$ on a given transformer can be effectively increased by reconnecting the individual primary windings in series-parallel or all in series. In this way the same transformer can be used to work with several capacitor banks having different characteristics.

To minimize the thickness of electrical insulation required between the primary and secondary windings of the transformer, the maximum voltage appearing at any place between the primary and secondary windings should be minimized. In a transformer designed in accordance with the present invention, the secondary windings will therefore normally be held at approximately the same mean potential as the mean potential between the input terminals of the primary winding.

The efficiency of a transformer may be increased somewhat by placing one fewer turns in the primary winding and instead making an interruption in the primary winding and attaching two leads at this point to divert the primary current through the load by way of the secondary output terminal. A transformer modified in this manner is commonly known as an auto-transformer. In a transformer designed in accordance with the present invention, the interruption in the primary winding will normally be placed near the middle turn of the primary windings, so as to maintain the secondary windings at approximately the same mean potential as the mean potential between the input terminals of the primary winding. In a transformer designed in accordance with the present invention where the auto-transformer connection is not employed, a secondary winding nearest to the midpoint of one of the primary windings may simply be connected electrically to the midpoint of the primary winding. If it is desired that the mean potential of the secondary winding should be approximately the ground potential, and if the midpoint of the primary winding is connected electrically to the secondary winding, then the two input terminals of the primary winding will be desired to have potentials above and below ground potential, respectively. Accordingly, the output terminals of the capacitor bank that is discharged into the transformer will be desired to have potentials above and below ground potential, respectively. The minor increase in complexity of a capacitor bank that has such output potentials is generally justified by the attendant reduction in the maximum voltage appearing between the primary and secondary windings of the transformer. If it is desired to operate the transformer from a capacitor bank that has one terminal at ground potential, and if it is further desired to hold one terminal of the transformer secondary at ground potential, and if it is further desired to make use of the auto-transformer connection, then the appropriate interruption in the primary winding should be placed next to the input terminal that is to be held at ground potential.

A typical load for which a transformer designed in accordance with the present invention may be used consists of a section of plane-parallel transmission line, with one of the two conducting strips that constitute the transmission line being made of a thin flexible conductor. The flexible component of the transmission line will be pressed away from the rigid component by the pressure of the magnetic field appearing within the transmission line during the electrical current pulse from the transformer. In a practical application, the motion of the flexible component may be used to generate pressure waves in a fluid for purposes of sound-wave generation or for purposes of forming metal work pieces immersed in the fluid. Typical dimensions of such a transmission line are width $w=10$ cm., length $s=20$ cm., and separation $h=.8$ cm., in which case the load inductance is .02 microhenry. Typical magnetic field strengths are desired to produce magnetic pressures of order 6000 pounds per square inch and are of order 100,000 gauss, requiring currents of order 1,000,000 amperes to be fed into the transmission line load. As has been shown in regard to the typical example quoted in the preceding discussion, a transformer designed in accordance with the present invention is well suited to operate efficiently for these typical circuit parameters of the transmission line load. An alternative design where the capacitor bank is discharged directly into the load would impose highly impractical and expensive requirements on the maximum tolerable inductance of the capacitors and the switch or switches, and on the current-carrying ability of the switch or switches. Another alternative design where a flexible conducting strip is moved by magnetic pressure arising from a multi-turn coil placed near the flexible diaphragm may be used to present the same electrical input characteristics as the primary of the transformer, but such a design cannot equal the electrical efficiency of the transformer plus transmission line load, because the stray magnetic field energy in the pressure-producing coil will generally exceed the stray magnetic field energy in a transformer designed in accordance with the present invention.

The basic pulse-transformer circuit is shown in FIGURE 1a. The capacitor bank 11 is discharged through the switch 12 into the primary 13 of the pulse transformer. The secondary 14 of the pulse transformer is connected to the load 15. An equivalent circuit for the pulse-transformer circuit of FIGURE 1a is shown in FIGURE 1b. The equivalent capacitor bank 11a has a capacitance that equals $R_n^2$ times the capacitance of the capacitor bank 11. The effective shunt inductance 16 is connected in parallel with the capacitor bank 11a. The effective leakage inductance 17 is connected in series with the load 15.

The circuit diagram of a current step-up transformer is shown in FIGURE 2. Several pairs of primary input terminals 18 are connected by low-inductance leads to the multi-turn primary windings 19. The one-turn secondary windings 20 are connected in parallel by low-inductance leads to the secondary collector leads 21. There is one one-turn secondary winding 20 for each turn of each of the multi-turn primary windings 19. If the transformer is desired to incorporate the auto-transformer feature, the optional low-inductance leads 22 may be connected at an interruption in each primary winding 19 and connected to the secondary collector leads 21 in such a manner that the primary current in passing through the secondary collector leads and the load acts to increase the secondary current. If the auto-transformer feature is not desired, the interruption of each primary winding 19 to which the optional leads 22 are attached should be short-circuited. The load is attached at the secondary output terminals 23.

Various details concerning the construction of a current step-up transformer are given in FIGURE 3. A side-view of a section of the transformer winding is shown in FIGURE 3a. The leads from the primary terminals are connected to the primary multi-turn winding 19a at the points 26 and 27. The leads to the secondary collector leads are connected to the one-turn secondary windings 20a, b, c at the points 24a, b, c and 25a, b, c. The spacer material 28 is used to fill up gaps between the windings, so as to permit tight compression of the whole assembly in the direction normal to the windings. The primary windings 19a and the secondary windings 20a, b, c are normally made of copper or other high-conductivity metal, and are electrically insulated from each other by means of sheet insulator such as Mylar film, or by means of an insulating coating. A one-turn secondary winding 20a is shown in FIGURE 3b. The winding 20c is the same as 20a. The one-turn secondary winding 20b, shown in FIGURE 3c has an extension piece 29, which is electrically and mechanically connected to the main part of the winding 20b, and which permits the output points 24b and 25b to be displaced relative to each other so as to facilitate placement of the low-inductance leads to the secondary collector leads. In a transformer having a greater number of turns for each primary winding than in the example shown, the additional secondary windings have the same shape as the one-turn winding 20a. The multi-turn primary winding 19a shown in FIGURE 3d is composed of a number of pieces that are electrically and mechanically connected at the points 29. The individual pieces of the primary and secondary windings can all be fabricated conveniently from sheet metal. The low-inductance lead connections to the secondary windings 20a and b are shown in FIGURE 3e. The leads 30a and 31a together make a low-inductance transmission line connecting the output points 24b and 25a to the secondary collector leads. The low inductance is achieved, because the adjacent currents in the leads 30a and 31a are equal and flow in opposite directions. The low-inductance lead connections at points 24b and 25a are the same as those shown in FIGURE 3e. In that case the leads 30b and 31b furnish the connection to the secondary collector leads. The low-inductance lead connections to the primary winding 19a and the secondary windings 20a and c are shown in FIGURE 3f. The leads 32, 33, and 34 together make a low-inductance transmission line connection the output points 24a and 25c to the secondary collector leads and connecting the primary input points 26 and 27 to the primary input terminals. The low inductance is achieved because the adjacent currents in the leads are equal and flow in opposite directions. The total transformer unit may contain a number of primary windings 19, each of which is interleaved with its own set of one-turn secondary windings, there being one secondary winding for each turn of the primary winding. The total number of primary windings and associated secondary windings are then stacked together in the direction normal to the plane of the windings, and are compressed tightly together.

If the transformer is desired to be operated as an auto-transformer, the modified primary winding 19b may be employed, as shown in FIGURE 4. An interruption or tapping in the primary winding 19a can be made conveniently at one of the points 29 where two component pieces are joined, and the output points 35 and 36 may then be used to attach leads to the secondary collector leads. If the potential of the secondary winding is desired to be near the midpoint of the potentials of the primary input terminals, the output points 35 and 36 should be located near the midpoint of the primary winding 19b.

A schematic view of the total transformer unit is given in FIGURE 5. Only a single primary winding with associated secondary windings and leads is shown. The secondary collector leads 38 and 39 are coaxially disposed and constitute a short section of low-inductance coaxial transmission line. The collector leads are insulated electrically from each other, but are fastened mechanically, for example by plastic bonding. The windings of the transformer are compressed together by the insulating end-plates 40 and 41, which have elevated central portions 42 which fit into the central hole in the stack of windings and serve to center the assembly. The drawbolts 43 are used to pull the end plates together. The low-inductance leads 30a and 31a, 33 and 34, 30b and 31b are respectively fastened together mechanically in pairs, for example by plastic bonding, but are insulated from each other electrically. A sufficient number of such leads will provide mechanical support for the secondary collector leads 38 and 39, or else mechanical support against the insulating end-plate 41 may be provided. The separation between the secondary collector leads and the end-plate 41 should be approximately equal to the inner radius of the winding stack, so as to permit the magnetic flux of the transformer to pass out radially between the end of the winding stack and the collector leads. The transformer may be operated as an air-core transformer, or else ferromagnetic material may be placed in the central bore of the stack of windings, or elsewhere.

A typical load and load connection for the current step-up transformer is shown in FIGURE 6. The conducting plates 44 and 45 are connected to the secondary collector leads of the transformer, which is inside the transformer housing 46. The flexible conducting strip 47 is attached to the rigid flanges 48 and 49, which emanate from the conducting plates 44 and 45. When a high-current pulse is generated by the transformer and passed around the circuit made by the flanges 48 and 49 and the flexible strip 47, the magnetic pressure generated by the current exerts a high transient pressure against the flexible strip 47, displacing it away from the flanges 48 and 49. This motion of the flexible strip 47 may be used to generate intense pressure waves in any fluid with which the flexible strip 47 is in contact. The magnetic pressure acting against the strip 47 is pressure generated by the interaction of the magnetic field appearing within the transmission lines 44 and 45 and the current flowing in the strip 47 which pushes the strip 47 away from the flanges 48 and 49.

Various of the novel features of the present invention are set forth in the following claims.

I claim:
1. A current stepup pulse transformer comprising,
  a plurality of multi-turn primary windings in the form of helically wound plates,
  means for tapping each said primary winding at its midpoint to provide a pair of midpoint leads,
  a plurality of single turn secondary windings in the form of plates, each turn of each said primary winding having an axially adjacent secondary winding,
  a pair of output conducting leads coaxial with the axes of said primary and secondary windings,
  means for connecting said secondary windings in parallel to said output conducting leads,
  and means for connecting said midpoint leads in parallel to said output conducting leads to provide auto transformer operation.

2. The pulse transformer of claim 1 wherein said means for tapping each said primary winding comprises a pair of conducting strips each having an end connected to a midpoint lead of said primary winding and each having an end connected to one of said coaxial conducting leads.

3. A current stepup pulse transformer comprising,
  a plurality of multi-turn primary windings in the form of helically wound plates,
  a plurality of single turn secondary windings in the form of plates, each turn of each said primary winding having an axially adjacent secondary winding,
  means for electrically insulating and mechanically connecting said primary windings and said secondary windings to form a cylindrical assembly,
  a pair of output conducting tubes coaxial with said cylindrical assembly,
  a pair of conducting strips for each said secondary winding for connecting said secondary windings in parallel to said output conducting tubes, said conducting strips mechanically supporting said conducting tubes to said cylindrical assembly.

4. The current stepup transformer recited in claim 3 wherein each said output conducting tube has a flange connected thereto,
  and wherein is included a transmission line in the form of a pair of conducting plates attached to said flanges for providing the electrical load for said transformer.

5. The current stepup transformer recited in claim 3 wherein each said output conducting tube has a flange,
  and wherein is included a pair of conducting plates attached to said flanges to carry the electric current flowing from said output conducting tubes,
  and wherein is included a flexible conducting element connected across said conducting plates,
  said conducting plates generating a magnetic field which interacts with the current flowing in said flexible conducting element to provide pressure on said flexible element.

References Cited by the Examiner

UNITED STATES PATENTS

| | | | |
|---|---|---|---|
| 316,354 | 4/1885 | Gaulard et al. | 336—183 X |
| 475,232 | 5/1892 | Burton et al. | 336—183 X |
| 2,474,395 | 6/1949 | Early et al. | 336—183 X |
| 2,599,182 | 6/1952 | Kerns | 336—182 |
| 2,882,507 | 4/1959 | Holz | 336—182 X |
| 2,937,350 | 5/1960 | Sasaki | 336—186 X |
| 2,946,981 | 7/1960 | O'Neill | 310—26 |
| 2,947,890 | 8/1960 | Harris et al. | 310—26 |
| 2,955,217 | 10/1960 | Harris | 310—26 |

ROBERT K. SCHAEFER, *Primary Examiner.*

JOHN F. BURNS, *Examiner.*

T. J. KOZMA, *Assistant Examiner.*